United States Patent
Fan et al.

(10) Patent No.: US 6,954,541 B2
(45) Date of Patent: Oct. 11, 2005

(54) METHOD OF DETECTING CHANGES OCCURRING IN IMAGE EDITING USING WATERMARKS

(75) Inventors: Zhigang Fan, Webster, NY (US); Hui Cheng, Bridgewater, NJ (US); Robert J. Rolleston, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 598 days.

(21) Appl. No.: 10/158,027

(22) Filed: May 29, 2002

(65) Prior Publication Data

US 2003/0223099 A1 Dec. 4, 2003

(51) Int. Cl.[7] ............................................. G06K 9/00
(52) U.S. Cl. ...................................... 382/100; 380/252
(58) Field of Search ........................... 380/210, 252, 380/287, 51, 54, 55; 713/176; 370/527–529; 382/100, 232; 283/74–81, 85, 93, 113, 901, 902; 399/366; 386/94; 705/57.58; 358/3.28

(56) References Cited

U.S. PATENT DOCUMENTS

| | | | |
|---|---|---|---|
| 5,636,292 A | * | 6/1997 | Rhoads ....................... 382/232 |
| 5,943,422 A | | 8/1999 | Van Wie et al. ................. 380/9 |
| 5,970,140 A | | 10/1999 | Sandford et al. .............. 380/7 |
| 6,512,837 B1 | * | 1/2003 | Ahmed ........................ 382/100 |
| 6,574,350 B1 | * | 6/2003 | Rhoads et al. .............. 382/100 |
| 2002/0012445 A1 | | 1/2002 | Perry ........................ 382/100 |
| 2002/0021824 A1 | | 2/2002 | Reed et al. ................. 382/100 |

FOREIGN PATENT DOCUMENTS

| | | |
|---|---|---|
| EP | 0 852 441 A1 | 7/1998 |
| EP | 0 903 943 A2 | 3/1999 |

\* cited by examiner

Primary Examiner—Brian Werner
Assistant Examiner—Chris Lavin
(74) Attorney, Agent, or Firm—Jeannette Walden

(57) ABSTRACT

A method of editing a digital image having associated embedded data, such as printing hints, includes embedding a first watermark in the original image before the image is edited. The first watermarking scheme associates first watermark information with each pixel and is used to detect which pixels have been edited. A second watermark may be embedded in the original image according to a second watermarking scheme which associates second watermark information with non-overlapping groups of pixels in the original image. The second watermark information may be used to synchronize the first watermark information and to detect editing information which does not change pixel values. After editing, only those edited portions of the image need have their embedded data reapplied.

21 Claims, 1 Drawing Sheet

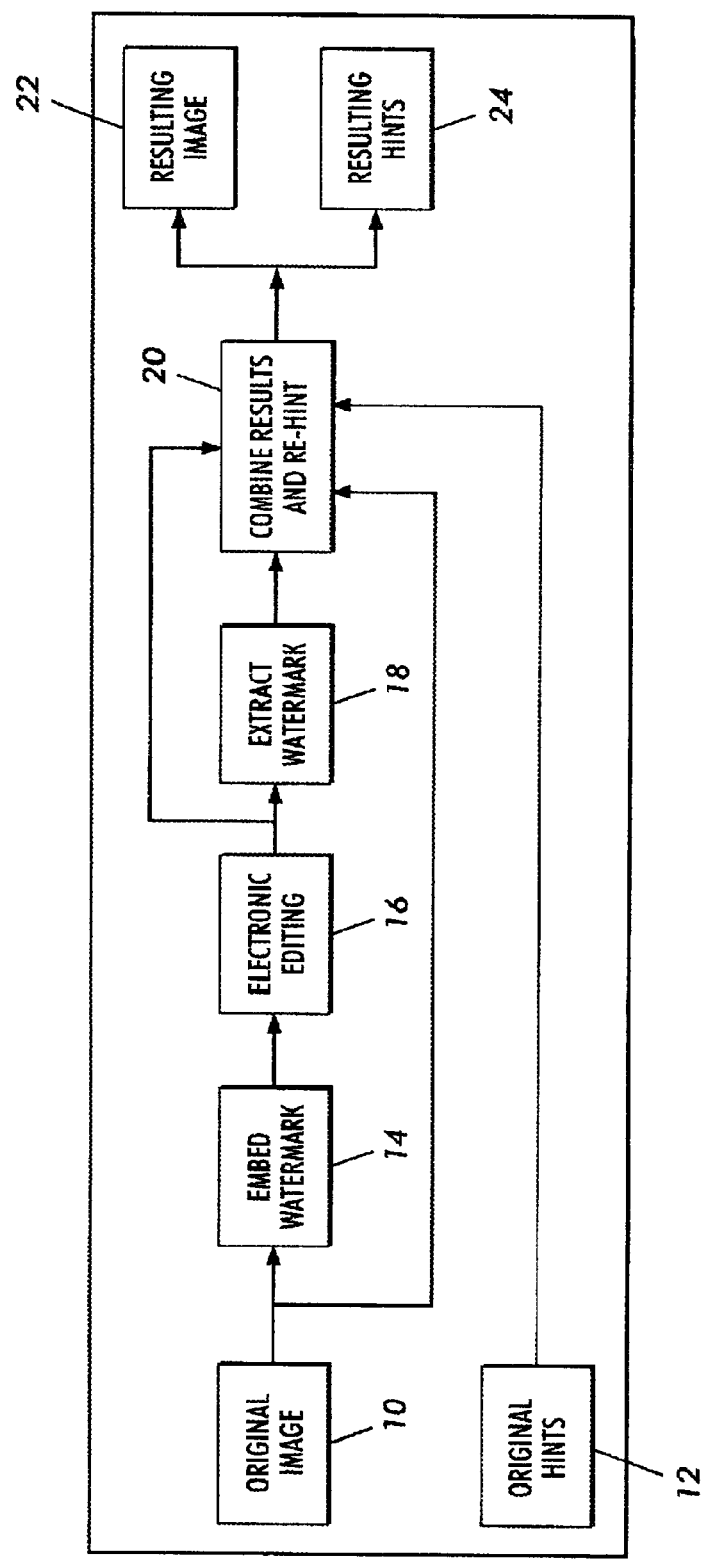

METHOD OF DETECTING CHANGES OCCURRING IN IMAGE EDITING USING WATERMARKS

FIELD OF THE INVENTION

This invention relates to digital imaging systems, and more particularly, to a method of detecting changes to embedded data associated with an image, such as printing hints, during image editing using a novel watermarking scheme.

BACKGROUND OF THE INVENTION

Associating embedded data with an electronic image has been used for many applications. For example, spatial-dependent metadata has been used to associate printing hints with an image. The use of printing hints increases the printer's ability to generate high quality document images. Embedded data has also been used to associate digital rights management information, such as copyright notices and permissions, with a document. However, when an electronic image is edited, the embedded data needs to be modified too, i.e., the embedded data needs to be re-associated with the corresponding edited portion.

One method of editing an electronic image permits the corresponding printing hints to be regenerated and then added; however, this method may be time consuming. Some commercial software image editing tools offer customers many options and choices, such as cropping, scaling, color manipulation and filtering. However, most commercial packages, such as Adobe PhotoShop, do not preserve printing hints. If an editing tool does not preserve printing hints, the edited image must have the printing hints re-associated with the edited image. Similarly, if other embedded data, such as digital rights data, is associated with different portions of an image, after image editing, the digital rights management data must be re-associated with the edited image.

Digital watermark technology has been used in various applications to embed additional information in an electronic image. Digital watermarks are usually printed as marks which cannot be easily identified by the human eye. Digital watermarks have been used to embed and store data associated with an image. Watermarks have also been used to detect edits to electronic images. Typically, "fragile" digital watermarks, which are sensitive to editing, are embedded in the images to be protected. To detect image editing, the watermarks are extracted from the image to be tested and compared to the original watermarks. The image is considered to be altered if significant discrepancies in the watermarks exist. If only a part of the image has been modified, digital watermark technologies may also identify the altered image regions. Nevertheless, the regions are typically detected at a very low-resolution.

There is a need for a method of editing an image which preserves image quality, and which permits embedded data associated with the original image to be easily associated with the edited image. Also, with the advent of image editing software, the ability to manipulate or otherwise alter a digital image is readily available. There is a need to be able to authenticate a digital image in order to determine whether or not the digital image has in fact been altered in some way.

SUMMARY OF THE INVENTION

A method of editing a digital image according to the invention identifies regions of the image that have not been "touched" by editing, so that the original embedded data associated with those regions can still be used, and only re-associates the embedded data with those regions of the digital image that have been changed. When an image has been translated, cropped or rotated as part of the editing operations, it is often difficult and computationally expensive to determine which regions were not changed, even if the original image is provided. The method of the invention uses watermarking technology to trace changes that occur during editing. Before an image is sent to an editor, two watermarks are added to the image. One of the watermarks is a fragile, high resolution watermark for detecting changes at the pixel level, and the other is a low resolution watermark used to record relative positioning of non-overlapping image blocks. After the editing is done, the two watermarks are extracted, and from them the unchanged regions and their original positioning are identified. The method is very computationally efficient.

A method of editing a digital image having embedded data associated therewith, includes embedding a first watermark in the original image according to a first watermarking scheme which associates first watermark information with each pixel in the original image; editing the embedded image; extracting the first watermark information from the edited embedded image to determine which pixels of the original image were edited; and associating the embedded data with those portions of the original image that were edited. In some instances, it may be necessary to regenerate the particular embedded data to be associated with the edited portions of the image. When the first watermark information is a code associated with each pixel's color, if the pixel's color is changed during editing, then the code associated with that pixel is changed.

The method may also include partitioning the original image into a plurality of non-overlapping blocks of pixels; embedding a second watermark in the original image according to a second watermarking scheme which associates second watermark information with each block of pixels in the original image; extracting the second watermark information from the edited embedded image to determine which blocks of pixels were edited; and using the extracted second watermark information to synchronize the first watermark information. When the second watermark information is a unique code for each block of pixels, the unique code can be used to determine if its associated block of pixels has been cropped or moved. The method of the invention can be used with any type of embedded data associated with the digital image, for example, printing hints or digital rights data. The proposed method provides efficient and effective tracing of changes occurring during electronic editing.

During some editing operations, the associated embedded data may need to be edited or regenerated before it is re-associated with the edited portions of the image. For example, an image portion may have its color changed requiring that the printing hint associated with the prior color be changed to accommodate the new color.

The method of the invention has broad applicability to digital imaging systems that employ printing hints to improve image rendering or for other purposes. When an image with a plane of printing hints is edited, the hints need to be updated, too. The method splits the printing hints from the image and uses two watermarks to identify edited regions in the image. The first is a fragile watermark embedded in the image to detect which regions have been edited. The second watermark is low resolution and embeds the position of each block of pixels in the image with the block. Thus, when a region has been cropped and moved, its original location can be determined and the corresponding hints moved to the new location. When editing is complete, the hint plane is updated by moving blocks if required and removing hints where the fragile watermarks were destroyed. The edited regions may then be re-hinted.

BRIEF DESCRIPTION OF THE DRAWINGS

FIG. 1 is a schematic of a method of detecting changes occurring in editing using watermarks.

DETAILED DESCRIPTION OF THE EMBODIMENTS

A schematic of an architecture for electronic editing of images is shown in FIG. 1. Although the method of the invention may be employed with any embedded data associated with an image, for convenience, it will be described with reference to printing hints. An original image 10 has associated with it a plane of printing hints 12. The original image 10 is first separated from its hint plane 12. Then, watermarks are embedded 14 in the original image before it is edited. Then the image with embedded watermarks is edited 16. Two kinds of editing may exist. The first kind does not alter pixel colors (values) and associated hints. This may include translations, cropping and rotation for certain angles (e.g., 90°, −90°, and 180°). For this kind of editing, the method will not only detect change, but also identify the type of change and its correspondence in the original image. The second kind of editing contains filtering, color manipulation, smoothing, scaling and other image processing operations that change pixel colors (values) and hints. After the editing is done, the watermarks are extracted 18. The watermarks are used to identify which regions of the image have been edited and which have not. The original hints associated with the original image are restored to the portions of the original image which were not edited. Only those regions which were edited have new hints associated therewith 20. The resulting image 22 and resulting hints 24 are thus created without having to re-associate or regenerate printing hints with the entire edited image.

Generally, when an image is edited, its color composition can be changed at the pixel level and portions of the image (e.g., blocks of pixels) can be translated, rotated or cropped. To trace both types of editing, two types of watermarks are embedded in the original document image. The first watermark is a high-resolution, "fragile" watermark, which can be called a change-sensitive watermark. The second watermark is a low-resolution watermark, which can be called the position-robust watermark.

The change-sensitive watermark is used to detect changes at the pixel level. Assuming, for example, that editing is always applied to a sufficiently large region (usually larger than 128×128 pixels) and that the region boundaries are smooth, the change-sensitive watermark can identify unchanged pixels to the single pixel accuracy with very high confidence. The position-robust watermark is associated with non-overlapping blocks of pixels and can be used to identify relative positioning of image blocks. The position-robust watermark can also be used to detect editing operations that do not change pixel values, such as cropping, translation and certain rotation operations. The change-sensitive watermark can also be used to synchronize the position-robust watermark.

In one embodiment of the invention, the original image is in CIE L*a*b* color space. (Any color space may be used.) A pixel location in the image can be denoted by (i,j) and the pixel color can be denoted by ($L_{i,j}$, $a_{i,j}$, $b_{i,j}$). In this embodiment, four bits are used to store the two watermarks; however, one or more bits may be used for each watermark. The change-sensitive watermark is stored using three bits: the least and second least significant bits in a* and the second least significant bit in b*. The position-robust watermark is stored in the least significant bit in b*.

Change-sensitive watermark. The high-resolution, change-sensitive watermark is used to detect any changes of a document image. It uses three bits in this embodiment: the last two least significant bits in a* and the second least significant bit in b*. Given the original pixel value as ($L_{i,j}$, $a_{i,j}$, $b_{i,j}$), the change-sensitive watermark in this embodiment is the check-sum of $L_{i,j}$, $a_{i,j}$ right shifted by 2 (remove the last two significant bits) and $b_{i,j}$ right shifted by 2, plus a bias $t_{i \bmod n, j \bmod m}$, then modulus by 8. An n×m (i.e., 4×4) bias array t is constructed using integers from 0 to 7, and in such a manner that is sensitive to the operations such as shifts and rotations of +90 and 180 degrees. Denote the pixel value after the change-sensitive watermark is embedded as ($L'_{i,j}$, $a'_{i,j}$, $b'_{i,j}$). Then the check-sum and the watermark can be computed as:

$$C_{i,j} = L_{i,j} + (a_{i,j} >> 2) + (b_{i,j} >> 2) \text{ and}$$

$$W_{i,j} = (C_{i,j} + t_{i \bmod n, j \bmod m}) \bmod 8.$$

($L'_{i,j}$, $a'_{i,j}$, $b'_{i,j}$) is calculated as:

$$L'_{i,j} = L_{i,j}$$

$$a'_{i,j} = (a_{i,j} >> 2) << 2 + W_{i,j} >> 1$$

$$b'_{i,j} = (b_{i,j} >> 2) << 2 + (W_{i,j} \bmod 2) << 1 + (b_{i,j} \bmod 2).$$

To detect the change-sensitive watermark, first extract the three bit watermark and calculate the check-sum. The bias term is estimated as:

$$t^*_{i,j} = (C_{i,j} - W_{i,j}) \bmod 8.$$

Then, by sliding t over the entire image and comparing it with t*, all unchanged blocks of n×m can be identified. To detect regions that are cropped and rotated by a multiple of 90 degrees, rotate the bias array t, and repeat the above process. Finally, the boundary of unchanged regions can be refined by applying parts of the bias array and comparing the number of matching pixels with a pre-determined threshold.

Position-Robust Watermark. To efficiently and effectively embed and detect the position-robust watermark, the change-sensitive watermark will be used for synchronization. First, the original image is partitioned into non-overlapping blocks of pn×qm pixels. Then, each pn×qm block is assigned a unique code, called a block address. For each n×m block within the pn×qm block, use the least significant bit of b* of nm pixels together to represent the block address assigned to this pn×qm block. Therefore, the block address for each pn×qm block is repeated p×q times.

Assuming that the editing is performed on sufficiently large blocks, to extract the block address, first use the change-sensitive watermark to locate all the n×m blocks that have not been changed. Using the bias array t as specified above, the boundary and orientation of each unchanged n×m block can be accurately located. Then, the position-robust watermark is extracted from these unchanged blocks. For all the pixels along the boundary of the editing window, their block addresses can be computed using their neighboring blocks, the change-sensitive watermark, the assumption and other information associated with the hints and the original image.

For this exemplary implementation, 4×4 blocks were chosen for the change-sensitive watermark, and 64×64 blocks for embedding the position-robust watermark. When the editing window is larger than or equal to 128×128 (less than half an inch by a half inch for 600 spi images), accurate recovery of the position-robust watermark is guaranteed. However, it usually can also accurately recover the watermark for much smaller block sizes.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of editing a digital image having embedded data associated therewith, comprising:
   embedding a first watermark in the original image according to a first watermarking scheme which associates first watermark information with each pixel in the original image;
   editing the embedded image;
   extracting the first watermark information from the edited embedded image to determine which pixels of the original image were edited;
   regenerating the embedded data for those portions of the original image that were edited; and
   associating the regenerating embedded data with those portions of the original image that were edited.

2. The method of claim 1, wherein the first watermark information comprises a code associated with each pixel's color, such that if the pixel's color is changed during editing, the code is changed.

3. The method of claim 1, wherein the first watermarking scheme comprises storing first watermark information associated with the pixel using at least one bit of the pixel's color as defined in a color space.

4. The method of claim 3, wherein (i,j) is a location of a pixel in the original image and $(L_{i,j}, a_{i,j}, b_{i,j})$ is a color of the pixel in Lab color space; and
   wherein the first watermarking scheme comprises storing first watermark information associated with the pixel at location (i,j) using one bit of $(a_{i,j}, b_{i,j})$.

5. The method of claim 3, wherein (i,j) is a location of a pixel in the original image and $(L_{i,j}, a_{i,j}, b_{i,j})$ is a color of the pixel in Lab color space; wherein the first watermarking scheme comprises storing first watermark information associated with the pixel at location (i,j) using three bits of $(a_{i,j}, b_{i,j})$.

6. The method of claim 5, wherein the first watermarking scheme comprises using the least and second least significant bits in a* and the second least significant bit in b*.

7. The method of claim 1, further comprising:
   partitioning the original image into a plurality of non-overlapping blocks of pixels;
   embedding a second watermark in the original image according to a second watermarking scheme which associates second watermark information with each block of pixels in the original image;
   extracting the second watermark information from the edited embedded image to determine which blocks of pixels were edited; and
   using the extracted second watermark information to synchronize the first watermark information.

8. The method of claim 7, wherein the second watermark information comprises a unique code for each block of pixels for identifying if a block of pixels has been cropped or moved.

9. The method of claim 7, wherein the second watermarking scheme comprises storing second watermark information associated with the pixel using at least one bit of the pixel's color.

10. The method of claim 7, wherein (i,j) is a location of a pixel in the original image, $(L_{i,j}, a_{i,j}, b_{i,j})$ is a color of the pixel, the plurality of blocks comprises pn×qm and each pn×qm block is assigned a unique block address.

11. The method of claim 10, further comprising:
   for each n×m block within the pn×qm blocks, storing the unique block address in one of the bits of each of the nm pixel's color.

12. The method of claim 11, wherein the bit comprises the least significant bit of each pixel's color.

13. The method of claim 7, wherein the embedded data comprises printing hints.

14. The method of claim 7, wherein the embedded data comprises digital rights data.

15. The method of claim 7, wherein the first watermark information comprises a code associated with each pixel's color, such that if the pixel's color is changed during editing, the code is changed; and
   wherein the second watermark information comprises a unique code for each block of pixels for identifying if a block of pixels has been cropped or moved.

16. The method of claim 7, wherein (i,j) is a location of a pixel in the original image, $(L_{i,j}, a_{i,j}, b_{i,j})$ is a color of the pixel and pn×qm is the number of blocks of pixels;
   wherein the first watermarking scheme comprises storing a first watermark associated with the pixel at location (i,j) using one bit of $(a_{i,j}, b_{i,j})$; and
   wherein the second watermarking scheme comprises storing a second watermark for each n×m block within the pn×qm block using one bit of $(a_{i,j}, b_{i,j})$.

17. The method of claim 7 wherein (i,j) is a location of a pixel in the original image and $(L_{i,j}, a_{i,j}, b_{i,j})$ is a color of the pixel and pn×qm is the number of blocks of pixels; wherein the first watermarking scheme comprises storing the first watermark information in the least and second least significant bits in a* and the second least significant bit in b* and wherein the second watermarking scheme comprises storing the second watermark information in the least significant bit of b* of nm pixels.

18. The method of claim 1, further comprising editing the embedded data before re-associating it with those portions of the original image that were edited.

19. A method of editing a digital image having embedded data associated therewith, comprising:
   embedding a first watermark in the original image according to a first watermarking scheme which associates first watermark information with each pixel in the original image;
   embedding a second watermark in the original image according to a second watermarking scheme which associates second watermark information with each non-overlapping group of pixels in the original image;
   editing the embedded image;
   extracting the first watermark information from the edited embedded image to determine which pixels of the original image were edited;
   extracting the second watermark information from the edited image to determine which blocks of pixels were moved or cropped;

using the extracted second watermark information to determine which blocks of pixels were edited;

using the extracted first watermark information to synchronize the second watermark information; and associating the embedded data with those portions of the original image that were edited, moved or cropped.

20. The method of claim 19, wherein the embedded data comprises printing hints.

21. The method of claim 19, wherein the embedded data comprises digital rights data.

* * * * *